United States Patent [19]

Miller

[11] 4,173,024

[45] Oct. 30, 1979

[54] AUDIO-VISUAL REPRODUCTION CARREL

[76] Inventor: Griffith C. Miller, 1024 N. Flood, Norman, Okla. 73069

[21] Appl. No.: 869,532

[22] Filed: Jan. 16, 1978

[51] Int. Cl.² .......................... H04N 7/16; E04H 1/00; A47B 81/06
[52] U.S. Cl. .................... 358/115; D25/16; 52/79.1; 52/234; 194/1 A; 194/9 T; 312/7 TV; 312/237; 312/239
[58] Field of Search ............... D25/16; 52/79.1, 234; 312/237, 239, 7 TV; 358/115; 194/1 A, 9 R, 9 T

[56] References Cited
U.S. PATENT DOCUMENTS

| | | | |
|---|---|---|---|
| D. 183,573 | 9/1958 | Keck et al. | D25/16 |
| D. 245,706 | 9/1977 | McAllister | D25/16 |
| 2,796,812 | 6/1957 | Koci | 194/9 R |

FOREIGN PATENT DOCUMENTS 1527776  6/1968  France ..................... 194/9 T

Primary Examiner—S. C. Buczinski
Attorney, Agent, or Firm—Robert M. Hessin

[57] ABSTRACT

Apparatus for selected audio-visual reproduction upon check actuation that consists of a viewing carrel providing comfort and privacy, and having in combination therewith, television playback apparatus, program selection control and money validator for enabling playback of a selected program. The television reproducing apparatus includes a video tape playback system functioning in coaction with a color television receiver as controlled by the money validator and playback selection control.

6 Claims, 5 Drawing Figures

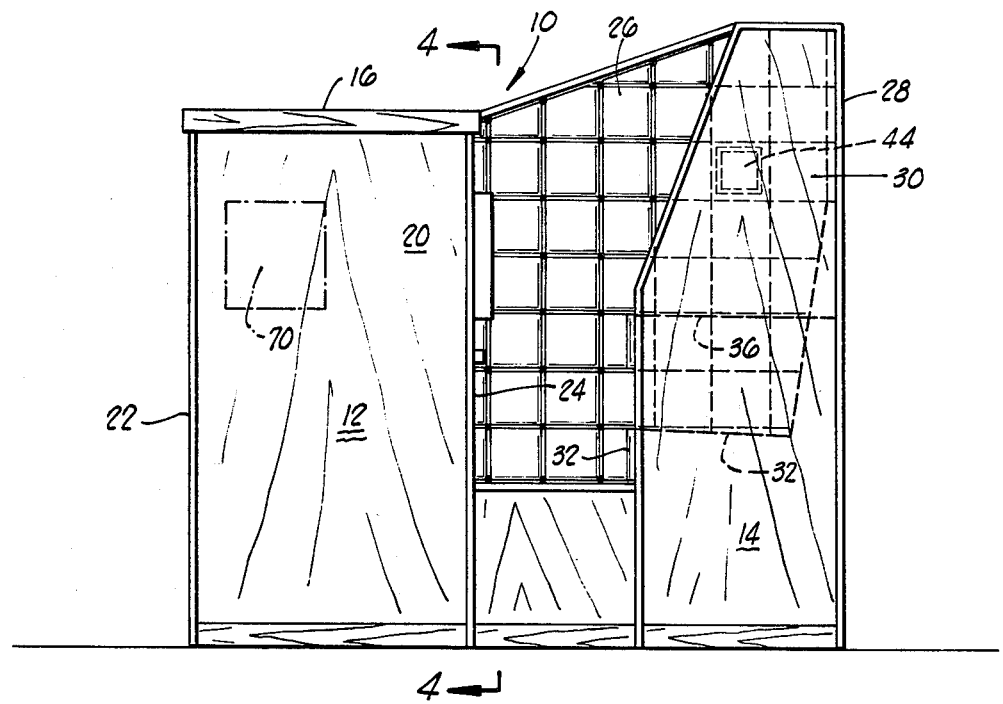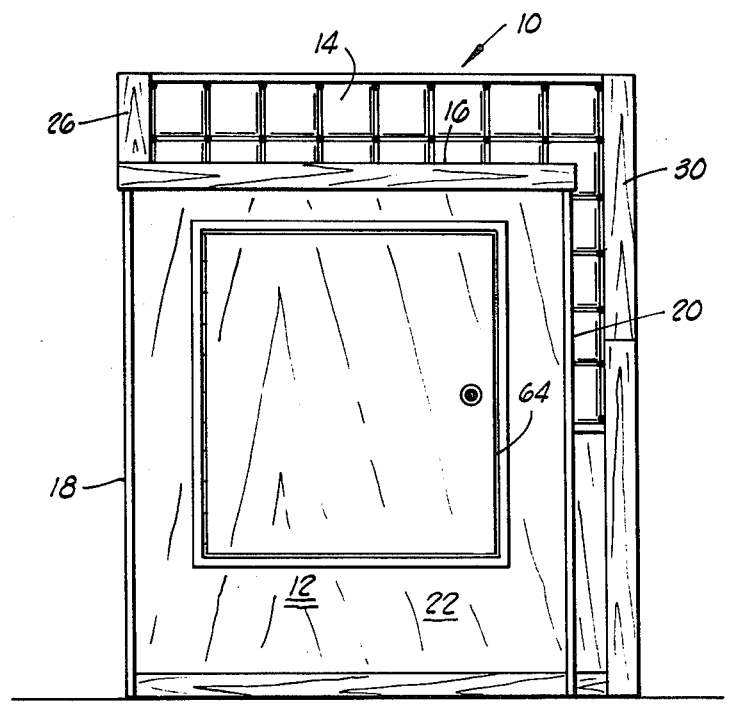

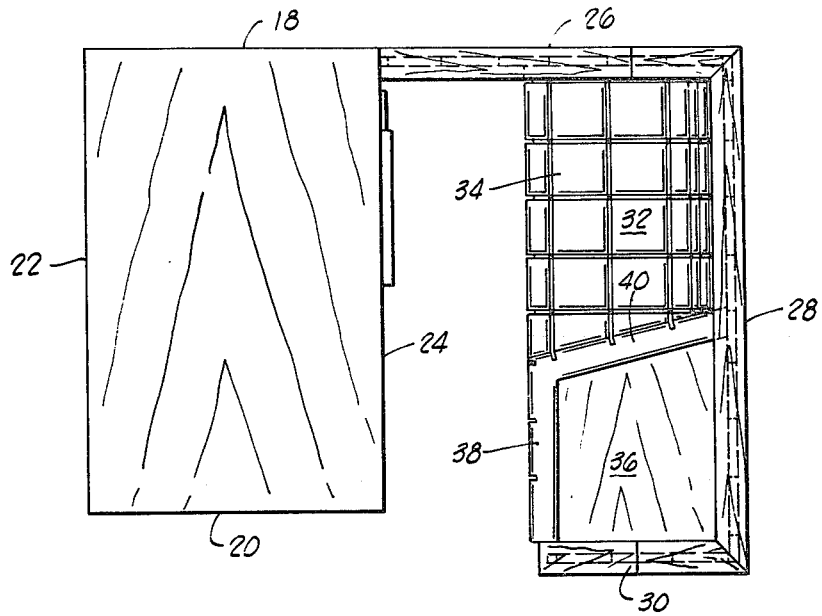
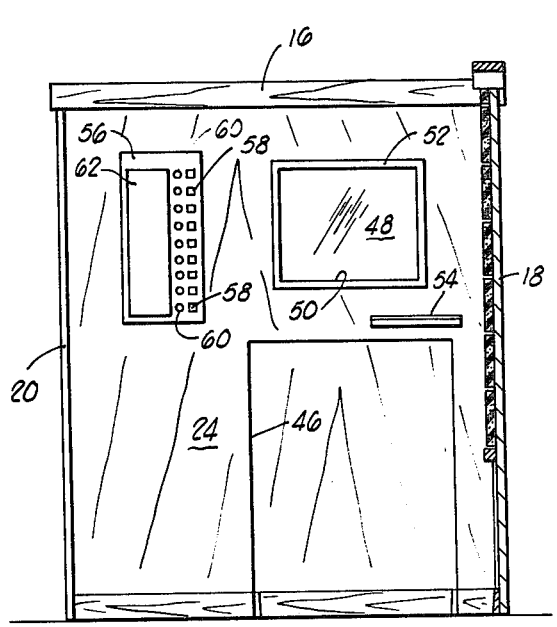
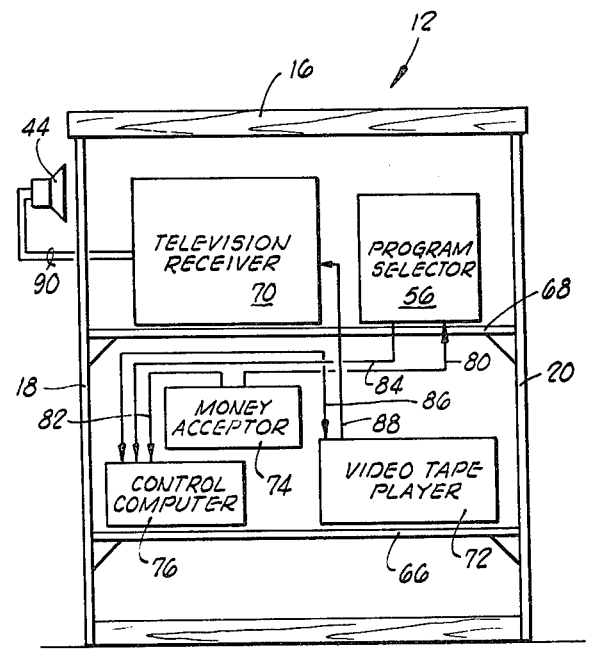
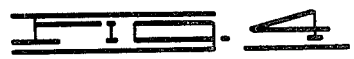

AUDIO-VISUAL REPRODUCTION CARREL

BACKGROUND OF THE INVENTION

1. Field of the Invention

The invention relates generally to viewing carrels for audio-visual reproduction and, more particularly, but not by way of limitation, it relates to improved carrel apparatus in combination with television tape playback apparatus for viewing selected subject matter upon payment of money, e.g., selected golf lesson materials.

2. Description of the Prior Art

The prior art includes numerous types of carrel device, including carrels in combination with certain particular teaching and message apparatus for delivery of information in the privacy of a carrel or booth. Some pertinent disclosures relating to the present form of information storage and retrieval are illustrated by the U.S. Pat. Nos. 3,970,775 (Lemelson); 3,911,204 (Spinelli); and 3,757,037 (Bialek); further, the Warner et al. U.S. Pat. No. 2,318,118 discloses a coin operated video playback system, much on the order of the conventional jukebox. However, there is no teaching known to Applicant that is directly related to the combination aspects of the privacy carrel with money validated playback of selected prerecorded television segments.

SUMMARY OF THE INVENTION

The present invention contemplates the combination of a privacy carrel with video tape playback as enabled by check actuation to display selected predetermined segments of television information. The carrel includes equipment space, operating panel and seating configuration which enables private viewing and highly localized audio reproduction to the benefit of the paid viewer and exclusion of all others.

Therefore, it is an object of the present invention to provide a private, audio-visual reproduction carrel that provides selected short subject playback when check actuated by an operator.

It is also an object of the invention to provide an audio-visual carrel that is comfortable and attractive in appearance yet provides adequate privacy of usage.

Finally, it is an object of this invention to provide an improved carrel providing audio-visual dissemination in response to check actuation and selection of one of a plurality of subjects as contained on programmed video tape replay apparatus.

Other objects and advantages of the invention will be evident from the following detailed description when read in conjunction with the accompanying drawings which illustrate the invention.

BRIEF DESCRIPTION OF THE DRAWINGS

FIG. 1 is a side elevation of a carrel constructed in accordance with the present invention;

FIG. 2 is a front elevation of the device of FIG. 1;

FIG. 3 is a front elevation of the operating panel of the device of FIG. 1;

FIG. 4 is a top plan view of the device of FIG. 1; and

FIG. 5 is a view in elevation of the carrel console with access panel removed, showing interconnection and positioning of primary components of the audio-visual apparatus.

DETAILED DESCRIPTION OF THE INVENTION

Referring to FIGS. 1 and 2, a carrel 10 consists of a console 12 and seat enclosure 14 as rigidly joined in construction to form an integral unit. The carrel 10 is constructed primarily of plywood paneling using conventional joining and finishing techniques, and vinyl padding is applied for aesthetic purposes where desired, especially in the interior of the seat enclosure 14.

Referring also to FIGS. 3 and 4, the console 12 consists of a top panel 16, opposite side panels 18 and 20, an access panel 22 and control panel 24. The panel 18 extends rearward into either rigid joinder or integral formation with a side panel 26 of the operator's enclosure 14. The side panel 26 is then securely joined to a rear panel 28 and outside panel 30 to fill out enclosure 14. The side panel 26 is formed with a top edge rising at approximately 55° relative to console top panel 16, and the heighth of the rear of side panel 26, rear panel 28 and outside panel 30 is made to be about eighteen inches higher than console 12 for security purposes, as will be further described.

The seat enclosure 14 is further formed by a conventional seat 32 (FIG. 4) as shown in dashed line in FIG. 1. Seat 32 is formed of wood paneling as securely affixed on three sides to rear panel 28 and side panels 26 and 30, and vinyl padding 34 is provided in covering for comfort and aesthetic appeal. As also shown in FIG. 4, a raised decking panel 36 is provided on the left hand side of seat 34 thereby limiting seat occupancy to one person while also providing a lateral shelf space for whatever useful purpose. The decking 36, approximately ten to twelve inches higher than seat 32 is delineated by wood panels 38 and 40 as covered by vinyl-covered trim for aesthetic purposes. Seat 32 and a seat back portion 42 are then suitably covered with tufted vinyl cushioning, kapok filled or the like, to provide comfort and pleasant appearance. Audio reproduction is effected by means of a speaker 44 mounted within rear panel 26 adjacent the seated viewer's ear. Actually, in present design, the rear panel 26 is formed of a double decking having internal space with speaker 44 mounted therein and opening into the enclosure 14.

As shown in FIG. 3, the control panel 24 includes a suitable knee hole 46 as formed by conventional right angular paneling so that the viewer sits in comfort while viewing the video screen 48. The video screen 48 is preferably of the nine to eleven inch diagonal measurement and recessed within a rectangular recess 50 to a depth on the order of one foot. A small visor panel 52, several inches in width, is affixed across the top edge of rectangular recess 50, and the combined effect of the shaped panel 52 and recess 50 is to eliminate any possibility of light interference or piratic viewing from the rear by unauthorized persons.

A money acceptor slide 54 is conveniently mounted in panel 24 in front of the viewing position, and this in present design is a bill validator of well-known type, as will be further described. It should also be understood that coin actuation or other check mechanism may be utilized to enable viewing of the present invention. A program selection panel 56 is also mounted in panel 24 and serves to enable selection by the viewer upon proper check actuation. The program selector 56 includes a plurality of push buttons 58, presently eight such selections, each associated with a flash indicator lamp 60 showing present button selection. A selector data plate 62 then provides listing of the plurality of selections and in present operation the visual reproduction is utilized for professional golf lessons such that selector 62 may read as follows:

1—Jack Nicklas on driving
2—Arnold Palmer on putting
3—Sam Snead on long irons, etc.

The control and reproducing equipment of carrel 10 is contained within console 12 accessible through access door 64 (FIG. 2) of front panel 22. As shown in FIG. 5, the interior arrangement of console 12 includes spaced shelves 66 and 68 upon which the control and playback equipment is suitably mounted. Thus, top shelf 68 includes means for mounting a conventional television set to provide viewing screen presentation through recess 50. In present design, a Sony Model KV-1204 Trinitron color television set 70 is utilized. A video tape player 72 is supported on bottom shelf 56 and a money acceptor 74 and control computer 76 are conveniently arranged for coaction adjacent the rear side of operating panel 24. The video tape player 72 may be such as the Sony Model VP-2000 "U-MATIC" which utilizes standard ¾ inch Video Cassettes. The money acceptor 74 is a commercially available type of dollar bill acceptor as obtained from National Rejectors, Inc. of St. Louis, Missouri. The selector and control computer 76 is a microcomputer control device known as the Automatic Cassette Locator which is also commercially available for hookup as depicted in FIG. 5 from Composite Video of Oklahoma City, Oklahoma.

The money acceptor 74 is actuated on insertion and acceptance of a dollar bill at the acceptor slide 54 (FIG. 3). Such actuation then provides enabling output via line 80 to program selector 56 and via line 82 to the control computer 76. Program selection data from the selector 56 is then routed via line 84 also for input to control computer 76, whereupon multi-lead interconnection from the control computer 76 via line 86 is applied to the video tape player 72 for operation of the tape indexing reels to select the proper program segment. This program segment is then played back from video tape player 72 and the video-audio signal is applied via line 88 in conventional manner to television receiver 70 for reproduction. Audio output from television receiver 70 is also applied in conventional manner via two wire pair 90 to the speaker 44 as located in rear panel 26.

In operation, the viewer activates the system by acceptance of money in the money acceptor 74, having chosen a selected one of push buttons 58. That is, the viewer selects the program he desires and then depresses the appropriate button 58 on program selector 56, then insertion and acceptance of the proper money denomination in slide 54 enables the system. The control computer 76 will then control the video tape player 72 to rewind or to fast forward to the exact desired place and, thereafter, to commence playback through television receiver 70. When the end of the selected program segment is reached, the control computer 76 will mute the picture and sound to the television receiver 70, and then control automatic rewinding or fast forward of video tape player 72 to the mid position of the three quarter inch cassette tape. That signals the end of that particular operational cycle, and additional money activation is required in order to recommence the selection of a new program segment.

A viewer could deposit as many as 256 units of money in the money acceptor 54 and select as many as 256 programs because control computer 76 includes memory sufficient to record this number. The control computer 76 then merely cycles out of memory, locating and playing back each of the selected subject programs one at a time. The video tape player 72 is a standard product; however, it is now contemplated to incorporate a modification that allows the machine to run at half speed. This makes it possible then to use one-half the normal amount of tape so that the search time (rewind or fast forward to control tone) as effected by control computer 76 will be cut in half thereby to reduce the time that the viewer must wait on a selected program. This modification also serves to eliminate or at least greatly reduce the possibility of piracy of the program materials.

The foregoing discloses a novel audio-visual reproduction carrel which is extremely reliable in operation and which is relatively compact and aesthetically appealing. It is presently contemplated that the device will be placed in golf pro shops and the like and, upon payment of the required amount of money, program selection may be made of any of various parts of the golf game as the viewer can watch demonstration on television receiver 70 and hear commentary and other audio material via the speaker 44. The carrel is so constructed that only a single viewer occupying seat 32 can view the television screen 48 or hear audio reproduction from speaker 44 with any clarity. The combined effect of the rear panel 28 and the television screen recess 50 (as well as visor panel 52) prevent additional rearward viewers from gaining advantage of that which a bona fide party has paid for. The electronic components contained within the carrel are essentially of commercially available character, those which have previously been brought to the point of exhibiting high reliability and, in like manner, the reproduction carrel constitutes a device which is relatively trouble free and exhibits all requisite advantages for a publicly used privacy carrel system.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. An audio-visual reproduction carrel for authorized exhibiting of selected ones of a plurality of program segments, comprising:

console means of generally cubic structure having a top panel, first and second opposite console side panels, an access panel and a fourth side operating panel;

side panel means formed in rigid abutment to said first console side panel and extending perpendicularly from said operating panel to terminate in a vertical edge dimension greater than that of said operating panel;

rear panel means rigidly affixed to extend perpendicularly and coterminously from the vertical edge of said side panel means;

outside panel means rigidly affixed to extend perpendicularly and coterminously from said rear panel means in generally planar agreement with said second console side panel but terminating to define entry space therebetween;

seating means rigidly affixed within said side panel means, said rear panel means and said outside panel means to be horizontally disposed and spaced from said console means operating panel;

recess means formed in said console means operating panel;

television receiver means disposed in said console means with the receiver viewing screen supported in said recess means in the field of view from said seating means;

video tape recorder means disposed within said console and including operative interconnection to supply audio and video electrical signals to said television receiver;

program selection control means which upon enablement allows selection of one of a plurality of video program segments and provides control to said video tape player to playback the audio and video electrical signals for input of a selected program segment to said television receiver means; and check actuation means for enabling said program selection control means upon proper check reception.

2. An audio-visual reproduction carrel as set forth in claim 1 wherein:

said vertical edge dimension of said side panel means, rear panel means and outside panel means is sufficiently great in vertical height relative to the vertical height of said operating panel recess means to prohibit direct view of said receiver viewing screen from a position higher than said rear panel means.

3. An audio-visual reproduction carrel as set forth in claim 1 wherein:

said seating means is panel constructed in two horizontal planes having a single seating plane in view of said recess means and a higher utility plane adjacent said outside panel means.

4. An audio-visual reproduction carrel as set forth in claim 1 wherein:

audio speaker means reproducing sound from said television receiver means is disposed in said side panel means adjacent said seating means and at a vertical distance thereabove to coincide generally with the ear level of the authorized viewer.

5. An audio-visual reproduction carrel as set forth in claim 1 wherein:

said program selection control means includes switch selection means for selecting one of at least eight of said selected program segments and visual selector indication means.

6. A reproduction carrel for authorized exhibiting of selected audio-visual materials, comprising:

console means of generally cubic structure having a top panel, first and second opposite console side panels, an access panel and a fourth side operating panel;

side panel means formed in rigid abutment to said first console side panel and extending perpendicularly from said operating panel to terminate in a vertical edge dimension greater than that of said operating panel;

rear panel means rigidly affixed to extend perpendicularly and coterminously from said side panel means;

outside panel means rigidly affixed to extend perpendicularly and coterminously from said rear panel means in generally planar agreement with said second console side panel but terminating to define entry space therebetween;

seating means rigidly affixed within said side panel means, said rear panel means, and said outside panel means in horizontal disposition;

recess means of predetermined longitudinal depth formed in said console means operating panel;

audio reproducing means disposed in said side panel means adjacent said seating means; and means for producing indication of visual matter in said recess means whereby said indication is only in the field of view of a viewer at said seating means.

* * * * *